(12) United States Patent
Hutchinson et al.

(10) Patent No.: US 11,330,324 B2
(45) Date of Patent: May 10, 2022

(54) DYNAMIC ADVERT SELECTION FOR PROGRAMME PLAYBACK

(71) Applicant: Piksel, Inc., Wilmington, DE (US)

(72) Inventors: Michael Hutchinson, Leeds (GB); Praful Thakare, York (GB)

(73) Assignee: PIKSEL, INC., Wilmingon, DE (US)

( * ) Notice: Subject to any disclaimer, the term of this patent is extended or adjusted under 35 U.S.C. 154(b) by 0 days.

(21) Appl. No.: 16/956,183

(22) PCT Filed: Dec. 19, 2018

(86) PCT No.: PCT/EP2018/085767
§ 371 (c)(1),
(2) Date: Jun. 19, 2020

(87) PCT Pub. No.: WO2019/121867
PCT Pub. Date: Jun. 27, 2019

(65) Prior Publication Data
US 2020/0344518 A1 Oct. 29, 2020

(30) Foreign Application Priority Data
Dec. 20, 2017 (GB) ..................................... 1721400

(51) Int. Cl.
*H04N 21/43* (2011.01)
*H04N 21/433* (2011.01)
(Continued)

(52) U.S. Cl.
CPC ....... *H04N 21/4331* (2013.01); *H04N 21/458* (2013.01); *H04N 21/812* (2013.01)

(58) Field of Classification Search
CPC ............. H04N 21/4331; H04N 21/458; H04N 21/812; H04N 21/6543
See application file for complete search history.

(56) References Cited

U.S. PATENT DOCUMENTS 5,664,948 A * 9/1997 Dimitriadis ............ G01C 21/26
324/207.26
6,698,020 B1 * 2/2004 Zigmond ............. H04N 21/812
725/34

(Continued)

FOREIGN PATENT DOCUMENTS

EP 1394761 A1 3/2004

OTHER PUBLICATIONS

International Search Report and Written Opinion issued by the European Patent Office for PCT Application PCT/EP2018/085767, dated Jan. 31, 2019.

*Primary Examiner* — Jefferey F Harold
*Assistant Examiner* — Timothy R Newlin
(74) *Attorney, Agent, or Firm* — Holzer Patel Drennan

(57) ABSTRACT

A method of playing media content including an advertising period at a playback device. The method includes: storing the media content in the playback device for playback to a user of the playback device; storing an indication of the playback time of the advertising period relative to the playback time of the media content; storing a plurality of candidate adverts for playing in the adverting period of the media content; playing the stored media content to the user; identifying, on playing of the stored media content, a point in time corresponding to the playback time of the advertising period; applying, responsive thereto, playback rules to determine an advert to be played from the candidate adverts; and playing the determined advert at the playback time of the advertising period.

14 Claims, 11 Drawing Sheets

(51) Int. Cl.
*H04N 21/458* (2011.01)
*H04N 21/81* (2011.01)

(56) References Cited

U.S. PATENT DOCUMENTS

| | | | | |
|---|---|---|---|---|
| 2001/0032333 | A1* | 10/2001 | Flickinger | H04N 21/42684 725/39 |
| 2002/0072966 | A1* | 6/2002 | Eldering | H04N 21/84 705/14.56 |
| 2002/0083443 | A1* | 6/2002 | Eldering | H04N 21/4532 725/34 |
| 2002/0097235 | A1* | 7/2002 | Rosenberg | H04N 21/25891 345/204 |
| 2002/0184047 | A1* | 12/2002 | Plotnick | H04N 5/76 705/1.1 |
| 2003/0074661 | A1* | 4/2003 | Krapf | G06Q 30/02 725/34 |
| 2004/0078385 | A1* | 4/2004 | Yamada | H04N 21/4622 |
| 2005/0172312 | A1* | 8/2005 | Lienhart | H04N 21/458 725/19 |
| 2006/0130095 | A1* | 6/2006 | Willis | A63F 13/52 725/42 |
| 2006/0222335 | A1* | 10/2006 | Russ | H04N 21/4147 386/249 |
| 2007/0154190 | A1* | 7/2007 | Gilley | H04N 21/8355 386/241 |
| 2008/0307454 | A1* | 12/2008 | Ahanger | G06Q 30/02 725/36 |
| 2010/0325413 | A1* | 12/2010 | Chandramouli | H04N 21/812 713/150 |
| 2011/0015975 | A1* | 1/2011 | Yruski | H04L 67/306 705/14.4 |
| 2011/0078002 | A1* | 3/2011 | Leary | H04H 20/103 705/14.4 |
| 2013/0110622 | A1* | 5/2013 | Shao | G06Q 30/0254 705/14.52 |
| 2014/0096155 | A1* | 4/2014 | Kim | H04N 21/435 725/32 |
| 2016/0182923 | A1* | 6/2016 | Higgs | H04N 21/23424 725/34 |

* cited by examiner

DYNAMIC ADVERT SELECTION FOR PROGRAMME PLAYBACK

BACKGROUND TO THE INVENTION

Field of the Invention

The present invention relates to the dynamic selection of advertising content within a programme which is recorded for delayed playback, in which the dynamic selection is determined by a set of rules for advert selection applied at the time of playback.

Description of the Related Art

It is known in the art for users to record a live broadcast, such as recording live television using a digital video recorder (DVR) or personal video recorder (PVR) function on a set-top box or other device. The recorded content will include the full programme, including any adverts broadcast with the programme.

When a viewer watches this recording at a later point in time, it is possible that one or more adverts may no longer be relevant or applicable.

For example: (i) an advert may refer to an upcoming show that, at the time at which the recorded programme is played, is already past; (ii) an advert may refer to a time limited offer on a product or service, which has expired by the time the recording is played; (iii) an advert as broadcast may have a low relevance to the viewer, such as an advert for home contents insurance when the viewer has recently renewed with another insurer; and (iv) an advert may not be applicable to the viewer in the location or context in which the programme is played, such as an advert for a supermarket normally local to the user, when the user is playing the recorded programme on holiday.

In accordance with the invention, an improvement is provided which addresses one or more of the above-stated problems.

SUMMARY OF THE INVENTION

In general there is stored a set of candidate adverts in a playback device, and then when an advert is to be played, one of the candidate adverts stored in the playback device is selected and played. One or more of the candidate adverts may be changed prior to playback, by the playback device requesting a change, or a change being sent to the playback device.

The candidate adverts are not fetched from a device external to the playback device at the time of playback. At the time of playback, the advert to be played is selected from the candidate adverts stored in the playback device at that time.

In one aspect the invention provides a method of playing media content including an advertising period at a playback device, the method comprising: storing the media content in the playback device for playback to a user of the playback device; storing an indication of the playback time of the advertising period relative to the playback time of the media content; storing a plurality of candidate adverts for playing in the adverting period of the media content; playing the stored media content to the user of the playback device; identifying, on playing of the stored media content, a point in time corresponding to the playback time of the advertising period; applying, responsive thereto, playback rules to determine an advert to be played from the candidate adverts; and playing the determined advert at the playback time of the advertising period.

The method may further comprise, prior to the step of playing the stored media content, transmitting a request for updated candidate adverts for playing in the advertising period. The method may further comprise receiving updated candidate adverts, and replacing the stored plurality of candidate adverts with the updated candidate adverts. The method may further comprise, prior to the step of playing the stored media content, receiving a notification of updated candidate adverts for playing in the advertising period, and replacing the stored plurality of candidate adverts with the updated candidate adverts. The playback device may not connected to a network on playback of the media content.

The playback rules may comprise mandatory rules and optional rules. A candidate advert may have to comply with each mandatory rule to be selected. A candidate advert may have to comply with one or more optional rules to be selected.

The playback rules may be applied to all candidate adverts for each advertising period, and a weighting determined for each advertising candidate based on the application of the playback rules, wherein the candidate advert having the highest determined weighting is selected for playback.

The playback rules may be applied to each candidate advert for an advertising period in a predetermined sequence, wherein if candidate advert satisfies the playback rule it is selected and none of the remaining candidate adverts are accessed for that time period. The predetermined sequence may correspond to a weighting associated with each advertising candidate.

The playback rules may be compared with the metadata of candidate adverts.

The media content may be associated with a plurality of advertising periods, there being provided a plurality of candidate adverts for each advertising period.

The playback rules may be applied in dependence on one or more of: a user profile stored at the playback device; a time of the playback.

The method may further comprise communicating with a cloud-based device for storing candidate adverts, wherein when a candidate advert is updated at the cloud-based device, the cloud-based device communicates a corresponding update to make at the playback device corresponding to the update at the cloud-based device.

In this aspect the invention also provides a playback device for playing media content including an advertising period comprising: a store for storing the media content in the playback device for playback to a user of the playback device; a store for storing a plurality of candidate adverts for playing in the adverting period of the media content; wherein the playback device includes a processor configured to: play the stored media content to the user of the playback device; detecting, on playing of the stored media content, a point in time corresponding to a playback time of the advertising period; apply, responsive to the detection, playback rules to determine an advert from the candidate adverts; and play the determined advert at the playback time of the advertising period.

The playback device may further comprise an interface, configured to transmit a request for updated candidate adverts for playing in the advertising period.

The playback device may be further configured to receive updated candidate adverts, and replacing the stored plurality of candidate adverts with the updated candidate adverts.

The playback device configured to receive a notification of updated candidate adverts for playing in the advertising period, and replace the stored plurality of candidate adverts with the updated candidate adverts.

The playback device may be configured not to be connected to a network on playback of the media content.

The playback rules may comprise mandatory rules and optional rules. The processor may be configured to determine a candidate advert complying with each mandatory rule for selection.

The processor may be configured to determine a candidate advert complying with one or more optional rules for selection.

The processor may be configured to apply the playback rules to all candidate adverts for each advertising period, and to determine a weighting for each advertising candidate based on the application of the playback rules, and select the candidate advert having the highest determined weighting for playback.

The processor may be configured to apply the playback rules to each candidate advert for an advertising period in a predetermined sequence, wherein if a candidate advert satisfies the playback rule it is selected and none of the remaining candidate adverts are accessed for that time period. The predetermined sequence may correspond to a weighting associated with each advertising candidate.

The processor may be configured to compare playback rules with the metadata of candidate adverts.

The media content may be associated with a plurality of advertising periods, there being provided a plurality of candidate adverts for each advertising period.

The processor may be configured to apply the playback rules in dependence on one or more of: a user profile stored at the playback device; a time of the playback.

The playback device may further comprise an interface for communicating with a cloud-based device for storing candidate adverts, wherein when a candidate advert is updated at the cloud-based device, the cloud-based device communicates a corresponding update to make at the playback device corresponding to the update at the cloud-based device.

In another aspect the invention provides a method of transmitting media content including an advertising period from a server to a playback device, the method comprising: determining media content to be transmitted; determining an advertising slot in a programme including the media content; determining a plurality of advert candidates for the advertising slot; transmitting the media content and the plurality of advertising candidates from the server to the playback device, the media content and adverts being transmitted in sequence according to the playout time of the programme in which they are included, wherein in the advertising slot each of the candidate adverts are transmitted. The method may further comprise transmitting metadata including playback rules to be applied on playback of the programme at the playback device, to enable selection from the candidate adverts when the advertising slot is played.

In this other aspect the invention provides a device configured to transmit media content including an advertising period to a playback device, the device further configured to: determine media content to be transmitted; determine an advertising slot in a programme including the media content; determine a plurality of advert candidates for the advertising slot; transmit the media content and the plurality of advertising candidates to the playback device, the media content and advertising candidate being transmitted in sequence according to the playout time of the programme in which they are included, wherein in the advertising slot each of the candidate adverts are transmitted. The device may further be configured to transmit metadata including playback rules to be applied on playback of the programme at the playback device, to enable selection from the candidate adverts when the advertising slot is played. The device is preferably a server.

BRIEF DESCRIPTION OF THE FIGURES

The invention is described with reference to the accompanying Figures, in which.

DESCRIPTION OF PREFERRED EMBODIMENTS

There is now described various examples and embodiments.

Figure 1:
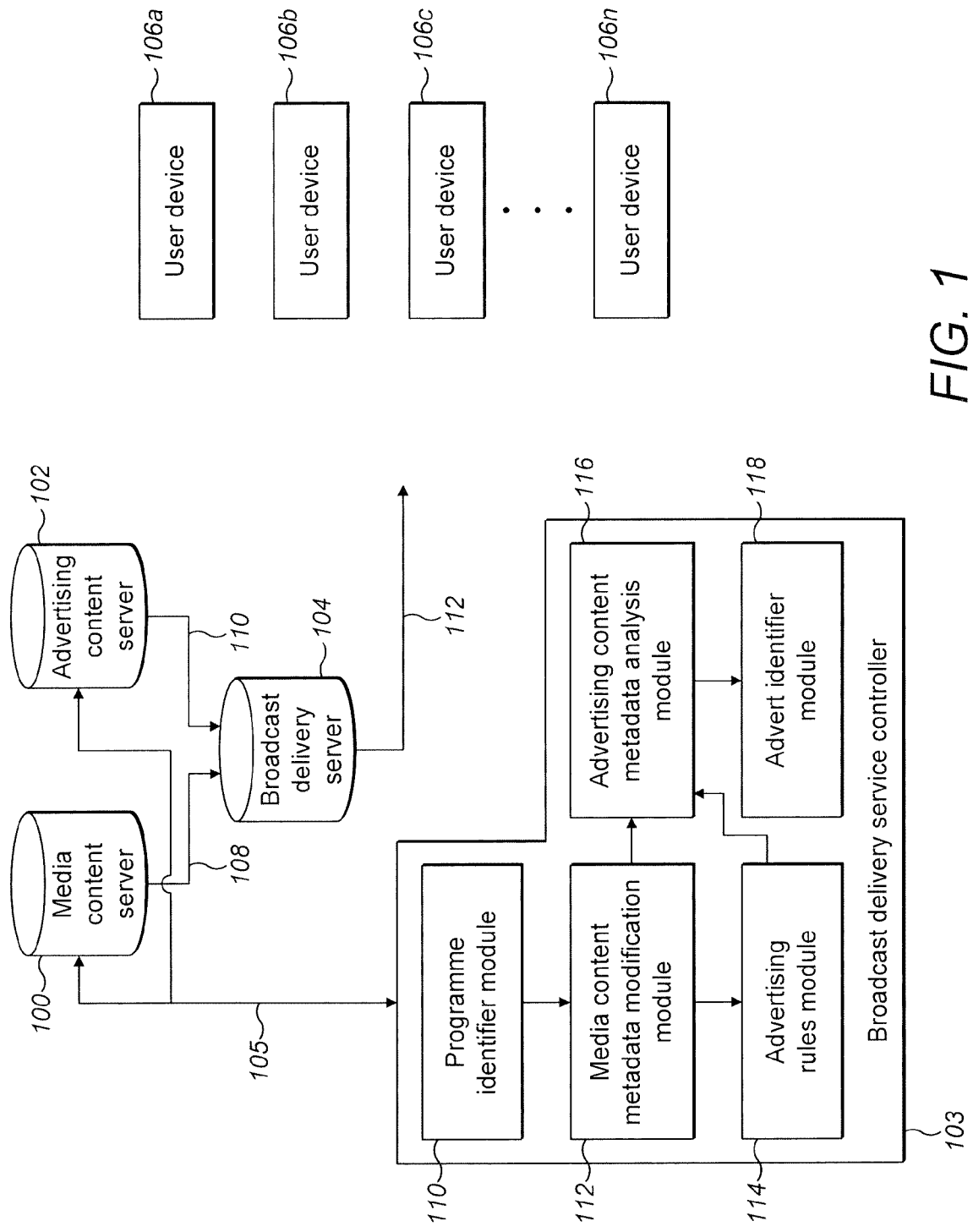
FIG. 1 there is illustrated a general architecture in which examples may be implemented.

With reference to FIG. 1 there is illustrated a general architecture in which examples in accordance with the invention may be implemented. As shown in FIG. 1, the architecture includes a media content server 100, an advertising content server 102, a broadcast delivery server 104, a broadcast delivery service controller 103, and a plurality of user devices 106a to 106n.

The broadcast delivery server 104 receives media content (e.g. programmes) on line 108 from the media content server 100, and advertising content on line 110 from the advertising content server 102. The broadcast delivery server 104 broadcasts programmes including adverts to the user devices 106a to 106n, as represented by line 112.

The broadcast delivery service controller 103 is associated with a broadcast delivery service for providing media content and advertising content from the servers 100 and 102 to the server 104, and is connected to each of the servers 100, 102, 104 via control lines 105. The broadcast delivery service controller 103 controls the delivery of programmes including adverts from the servers 100 and 102 to the server 104, and controls the broadcasting from the broadcast delivery server 104.

The broadcast delivery service controller 103 controls the broadcast of programmes including adverts in accordance with a provided service. It may provide live broadcast of programmes including adverts, or it may provide on-demand delivery of programmes including adverts. In accordance with a broadcast schedule, or responsive to a demand for content, it selects media content from the server 100 and provides them to the server 104, and in accordance with rules (as discussed below) selects and provides advertising content for a programme from the server 102 and delivers that advertising content to the server 104. In the examples described it is assumed that the programme including adverts are broadcast, but one skilled in the art will appreciate how the programme including adverts could alternatively be delivered, such as using on-demand services.

Further details of the broadcast delivery service controller 103 are shown in FIG. 1. As shown further in FIG. 1, the broadcast delivery service controller 103 comprises a programme identifier module 110, a media content metadata modification module 112, an advertising rules module 114, an advertising content metadata analysis module 116, and an advert identifier module 118.

When the broadcast content service identifies a programme for broadcast, the broadcast delivery service controller 103 retrieves the metadata of the media content of that programme from the server 100, and stores that media content metadata in the module 110.

The media content metadata modification module 112 modifies that metadata to include in it, for the programme, an identification of the advertising slots within the programme, and also include other identification information such as the number of slots, the duration of the slots, and possibly the timing of the slots within the programme. This information relating to advertising is assumed, in the described example, to be associated with the specific broadcast service: the advertising information included in the programme will be different for different broadcast services. In an example where the broadcast service does not utilise adverts, no advertising information is included in the programme metadata—such a scenario falling outside the scope of this description.

In an alternative scenario the media content itself may be associated with fixed advertising information, such as advertising slots, duration and timelines, and in module 112 this information is retrieved from the metadata. However a more typical scenario is that the broadcast service provides this information, and therefore the media content metadata is modified to accommodate it.

In another envisaged scenario the programme may be associated with default advertising metadata, which is used in the event that the broadcast service has no preference.

The rules used to select the candidate adverts for broadcast may be different to the rules used to select the candidate adverts on playback at the playback device, and hence reference is made herein to start-up rules and playback rules.

The broadcast service may provide different information for each advertising slot depending on the context in which the programme is to be broadcast. For example, the broadcast service may provide criteria which is indicative that the handling of the advertising slot should vary in accordance with the context an advert is played back, such as the location of the playback device or the type of the playback device. Such criteria may not be utilised by start-up rules in selecting the candidate adverts, but may be used by playback rules as discussed later. This criteria therefore needs to be included in the modified metadata as playback rules. However the start-up rules may recognise these different contexts can be catered for in selecting the initial candidate adverts.

The adverting rules module 114 stores start-up rules associated with the broadcast service, which may include criteria associated with a particular advertising campaign. The start-up rules to be applied may also be selected based on the metadata of the media content retrieved from the media content server 100, which for example may indicate the type of content, and this may be used in combination with the broadcast service information to select the start-up rules. Thus the start-up rules may determine, in accordance with the broadcast service information regarding the advertising to be used, in combination with the metadata indicating the programme content, the advertising candidates to be selected on start-up. A plurality of start-up rules may be provided, and a particular set of start-up rules chosen based on the identification of the media content and/or the advertising policy in place for the broadcast service (including any ongoing advertising campaign).

The start-up rules selected are used to select for the programme a set of candidate adverts for each advertising slot, to be broadcast with the programme. The start-up rules used to identify the candidate adverts on start-up may, for example, use the identity of the number of candidate adverts for each advert slot, and the criteria for selecting those candidates. The criteria may include the time of the intended broadcast. The start-up rules may also use the metadata indicating the type or nature of the media content so as to determine candidate adverts based on the media content—e.g.—if the media content is about cars, adverts relating to cars may be more likely to be candidates.

The advertising content metadata analysis module 116 receives the modified metadata of the media content and the selected start-up rules. In addition, the module 116 retrieves the metadata of the advertising content from module 102.

The module 116 determines the adverts which comply with the start-up rules, in order to select the candidate adverts for selection to be broadcast with the programme. Based on the modified metadata of the media content, the broadcast content service applies the start-up rules (as mentioned above) to select for each advertising slot multiple candidate adverts.

An identity of the selected adverts are then stored in an advert identifier module 118.

As discussed there may be provided playback-rules distinct from the start-up rules, and the playback rules may be provided to the delivery server 104 rather than the start-up rules. The start-up rules may be linked to the playback rules, and the selection of start-up rules may determine which playback rules to utilise. A programme metadata may identify the start-up rules and the playback rules separately.

Figure 2:
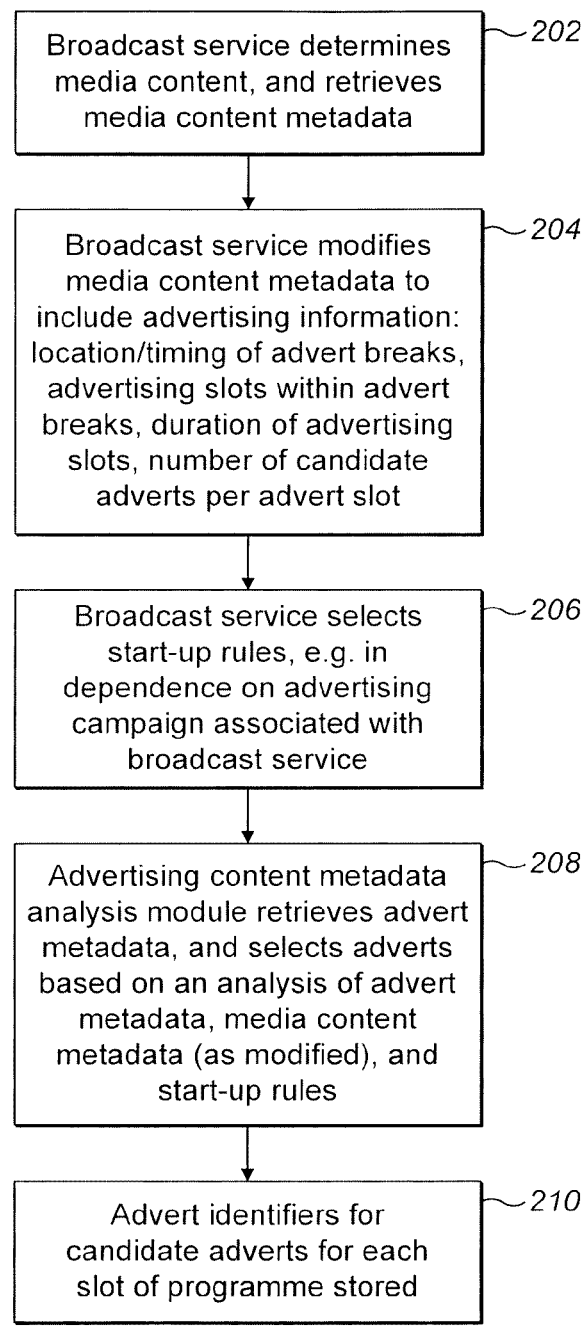
FIG. 2 shows an example process for selecting candidate adverts.

With reference to FIG. 2, there is illustrated an exemplary process in preparing the broadcast.

In a step 202, the broadcast service determines the media content, and retrieves the media content metadata.

In a step 204, the broadcast service modifies the media content metadata to include advertising information for the programme. This advertising information may be the location/timing of advert breaks within the programme, the location/timing of advert slots within the advertising breaks, the duration of adverting slots, and the number of candidates to be provided per advert slot.

In a step 206, the broadcast service selects the start-up rules. These rules may be selected in dependence on an advertising campaign associated with the broadcast service. The rules may be selected, additionally or instead, in dependence on the content of the programme as identified by its metadata.

It is a standard operation for the broadcast delivery service to provide the adverts. There might be a simple request to advert servers, there might be campaigns that the broadcaster is handling etc. Advert targeting logic may be used, with similar sets of rules being used by all advertisers/ broadcasters. It is not proposed to change the existing methodology for advert selection, but instead the present description focuses on a technique to supply a set of relevant adverts from a playback device.

For instance, an implementation may require a set of a 3 advert candidates for each advert slot. Each advert candidate has four different pieces of information that correspond to different criteria that the playback device may apply if the content is played out:

| AdNo | Time period | device type | location | profile information, |
|---|---|---|---|---|
| 1 | Sep 17-Nov 17 | all mobile | IP no. xxx-xyy | preferably female consumer |
| 2 | Sept 17 | all mobile + TV | no restrictions | all consumer |
| 3 | Nov 17-24.12.17 | all | IP no. Xyy - YYY | preferably male consumer |

In a step 208, the advert metadata is retrieved, or accessed, and adverts are selected based on an analysis of the advert metadata, the media content metadata (as modified), and the start-up rules.

In a step 210, the selected advert identifiers are stored for the candidate adverts for each slot of the programme.

The broadcast delivery service controller then delivers to the broadcast delivery server 104 the media content and its modified metadata, the advert candidates and the metadata for each, and the playback rules. The media content and advertising content may be retrieved from the servers 100 and 102, the metadata of the media content (as modified) and the adverts may be provided from the modules 112 and 106, and the rules may be supplied from the advertising rules module 114.

Figure 3:
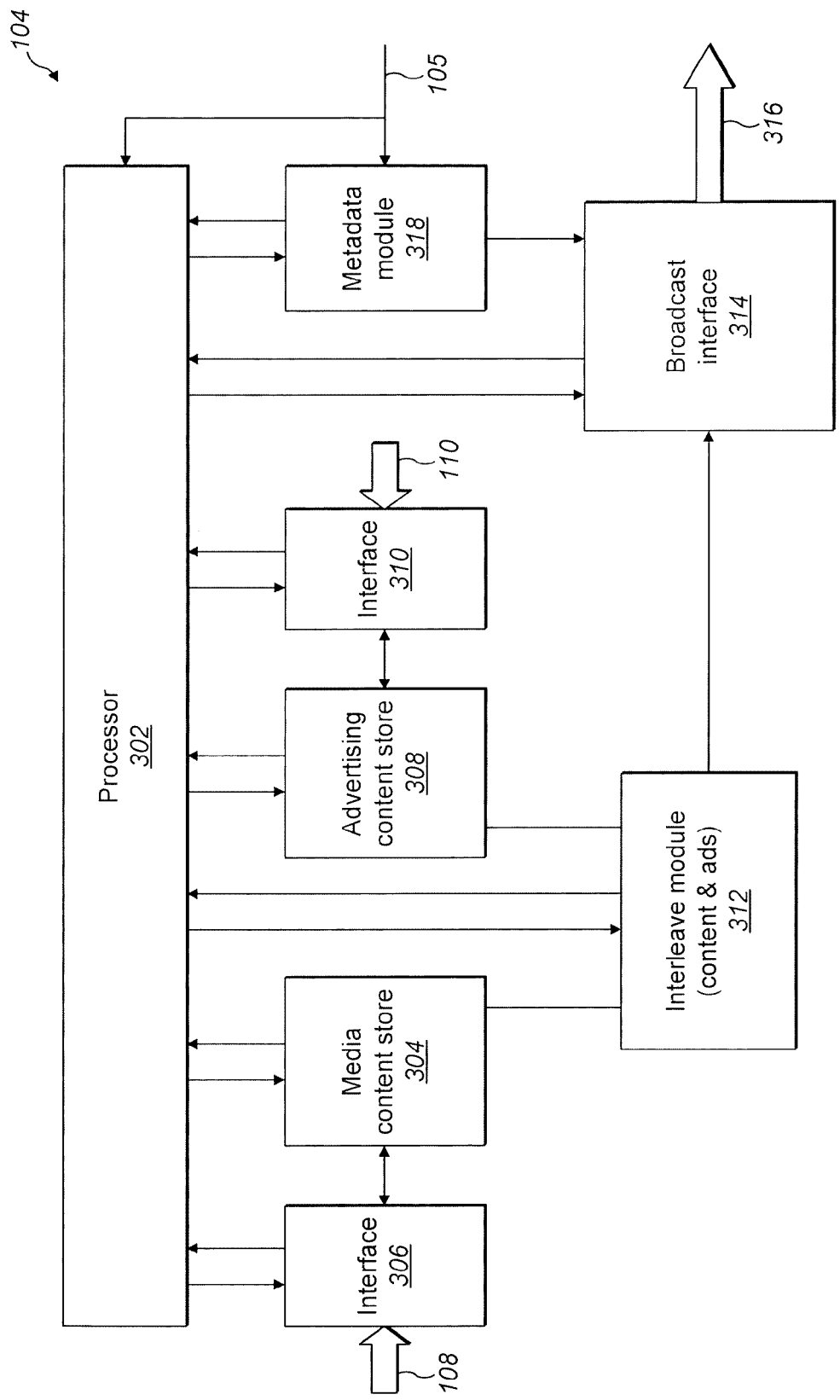
FIG. 3 shows in further detail an example implementation of a broadcast delivery server of the architecture of FIG. 1.

With reference to FIG. 3, there is shown in further detail an example implementation of the broadcast delivery server 104. The broadcast delivery server includes a processor 302, a media content store 304, a media content interface 306, an advertising content store 308, an advertising content interface 310, a metadata module 318, an interleave module 312, and a broadcast interface 314. All elements of the broadcast delivery server 104 operate under the control of the processor 302. The processor 302 generates control signals to, and receives signals from, each of the other elements of the broadcast delivery server 104.

The processor 302 controls the interface 306 to receive media content via lines 108 for storage in the media content store 304. The processor 302 controls the interface 310 to receive advertising content via lines 110 for storage in the advertising content store 308.

The processor 302 stores metadata associated with the programme including adverts to be broadcast in the metadata module 218.

Rules which are to be used determine the candidate adverts on playback, the playback rules, may also be provided as metadata and stored in the metadata module 218, and provided on line 105 from the controller 103. The metadata module thus has some or all of metadata for the media content, metadata for the programme, metadata for each candidate advert, and metadata identifying the playback rules used to select candidate adverts.

Optionally the set-up rules may also be provided, but where playback rules are provided separately there may be no requirement for the set-up rules to be provided. Optionally the set-up rules and the playback rules may be the same, so there is simply a set of advert rules.

The playback rules may simply be provided as metadata, and are not used/applied at the server side.

The interleave module 312 is controlled by the processor 302 to interleave media content and advertising content from the respective stores 304 and 308, for delivery as a programme to the broadcast interface 314. The broadcast interface 314 additionally receives metadata from the metadata module 318. The broadcast interface 314 broadcast a programme including adverts, and its associated metadata, on line 316.

The broadcast by the interface 314 may be controlled by the processor 302 under control of the controller 103 via signals 105.

Figure 4:
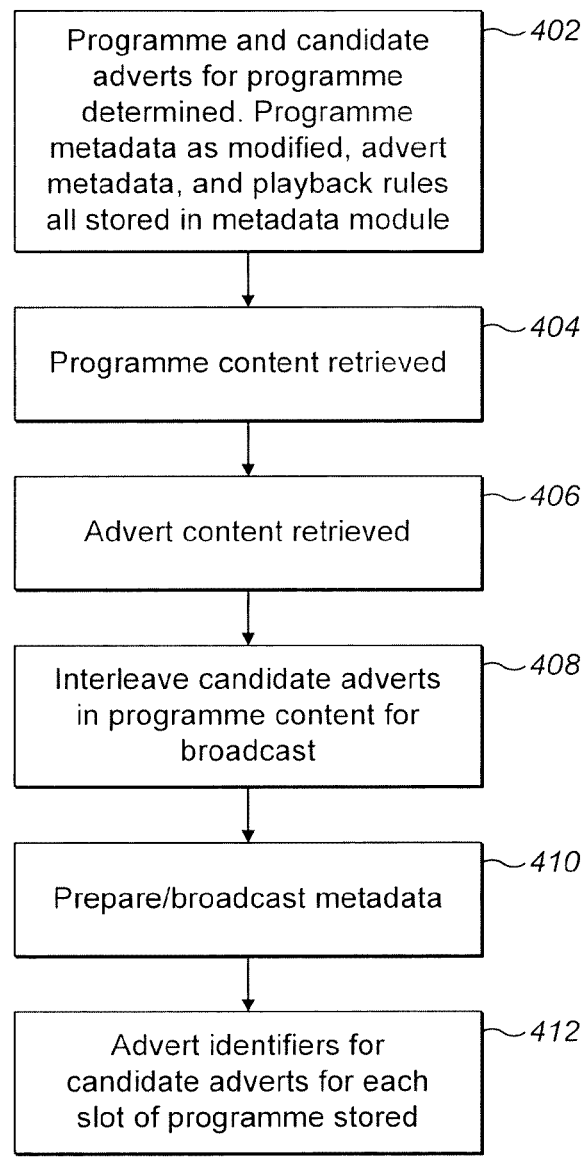
FIG. 4 illustrates an example process performed by the broadcast delivery server of FIG. 3.

FIG. 4 illustrates an example process performed at the server side to prepare and transmit the broadcast.

A step 402 indicates that the programme to be broadcast has been determined, and the adverts to be included as candidate adverts have also been determined. The modified programme metadata, the advert metadata, and the playback rules metadata are all stored in the metadata module 318.

In a step 404, the processor 302 retrieves the media content for the determined program, which is retrieved to be stored in programme content store 304. In an alternative, the media content may be streamed from the content server 100, rather than transferred to the store 304.

In a step 406, the processor 302 then retrieves the identified advertising content, which is retrieved to be stored in advertising content store 308. In an alternative, the content may be streamed from the advertising server 102, rather than transferred to the store 308.

The advertising candidates are adverts which are potentially to be displayed with the content, in dependence on the application of the playback rules.

In a step 408, for each advertising break in the content, the processor inserts all the advertising candidates. This may be done with the interleave module 312.

In a step 410, metadata describing the programme comprising the content and the inserted advertising content candidates, and the rules used, is prepared and broadcast by the metadata module 318.

Thus the broadcast delivery service provides the programme including the media content, the candidates for the advert slots, and the rules for selecting between the candidates for the advert slots.

Figure 5:
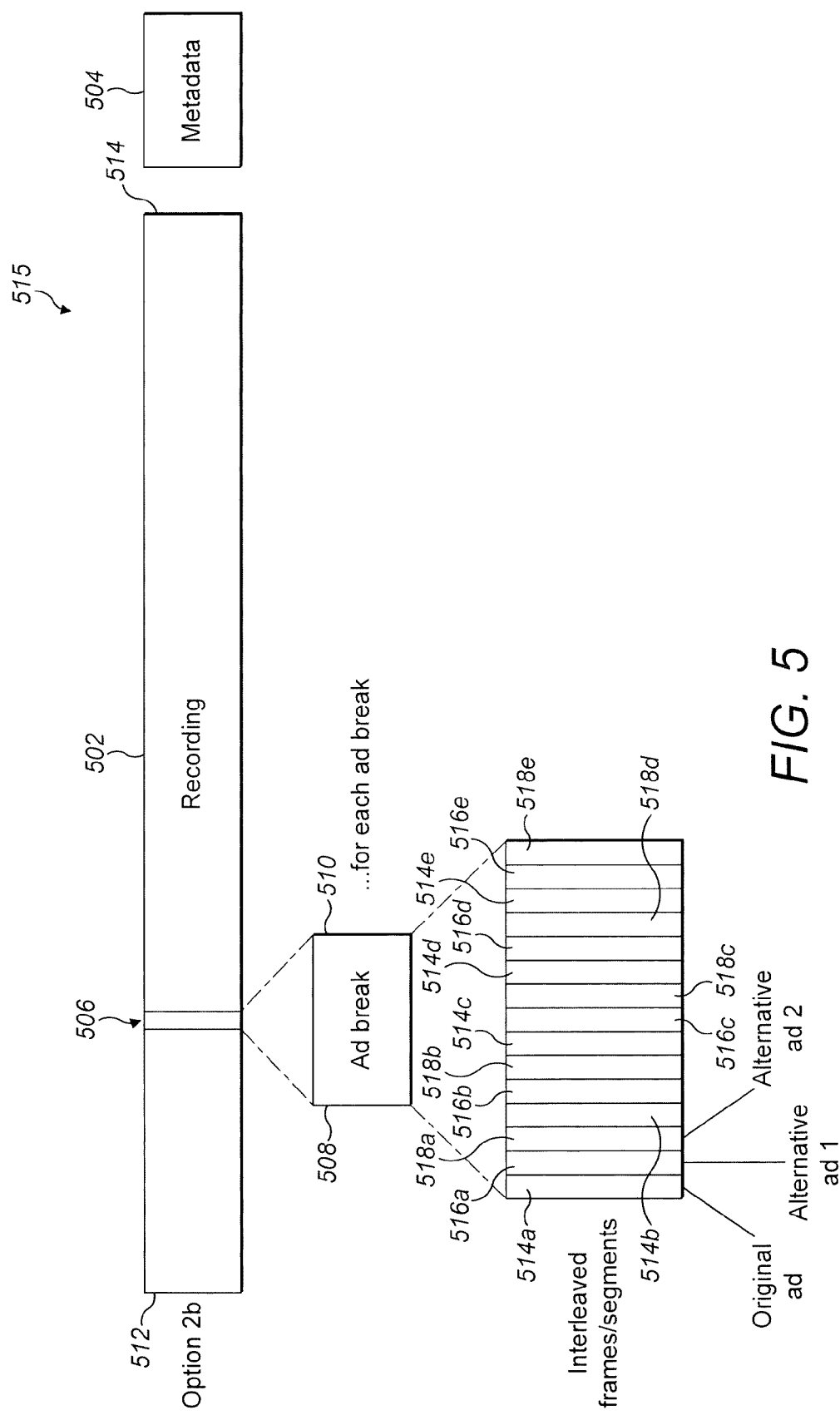
FIG. 5 illustrates an example of insertion of advertising content candidates at an advertising break location in the programme content.

With reference to FIG. 5, there is illustrated the insertion of advertising content candidates at an advertising break location in the programme content, and the general broadcast from the server to the user device(s).

Reference numeral 502 denotes the programme/advert, and reference number 504 denotes the associated metadata for the programme/adverts.

Reference numeral 506 generally denotes the location of advertising slots in the programme content. As shown by the exploded view, the advertising location 506 has a start location denoted by reference numeral 508 and an end location denoted by reference numeral 510. It will be understood that the length of the programme 502 can be considered as a period of time, and the reference numeral 508 denotes a period in time prior to the period in time of reference numeral 510. Reference numerals 512 and 514 denote the beginning and end respectively, in time, of the programme duration.

As shown by the further exploded view, the advertising location between positions 508 and 510 is provided with a plurality of advertising content candidates. In this example, there are five advertising slots between the locations 508 and 510, and there are three candidates for each of the five slots:

A first slot, having candidates 514*a*, 516*a*, 518*a*;
A second slot, having candidates 514*b*, 516*b*, 518*b*;
A third slot, having candidates 514*c*, 516*c*, 518*c*;
A fourth slot, having candidates 514*d*, 516*d*, 518*d*; and
A fifth slot, having candidates 514*e*, 516*e*, 518*e*.

In an example, the first candidate, such as candidate 514*a*, may be an original advertising content for the slot, such as the advertising content that would be provided in the event that no options are provided, and the other two candidates for the slot, such as candidates 516*a* and 518*a*, are alternatives which are selected in place of the original advertising content in dependence on the rules.

As above, the broadcast delivery service determines the advert candidates for each slot, and the insertion of advert candidates is in accordance with the information provided by the broadcast delivery service.

The programme is preferably broadcast with the media content in sequence with candidate adverts positioned in the advert breaks in the media content in the time sequence they would be played. As discussed further below, when the advert break is played, only one of each candidate advert is played for each advert slot to ensure the time duration of the played-back advertising slot is correct. Thus the broadcast programme length is preferably longer than the playback programme length.

Alternatives can be envisaged, where a media content identifier and/or an advert identifier is transmitted rather than the content itself, and the playback device uses the identifiers to retrieve the media content and/or the advertising content based on the identifiers.

Figure 6:
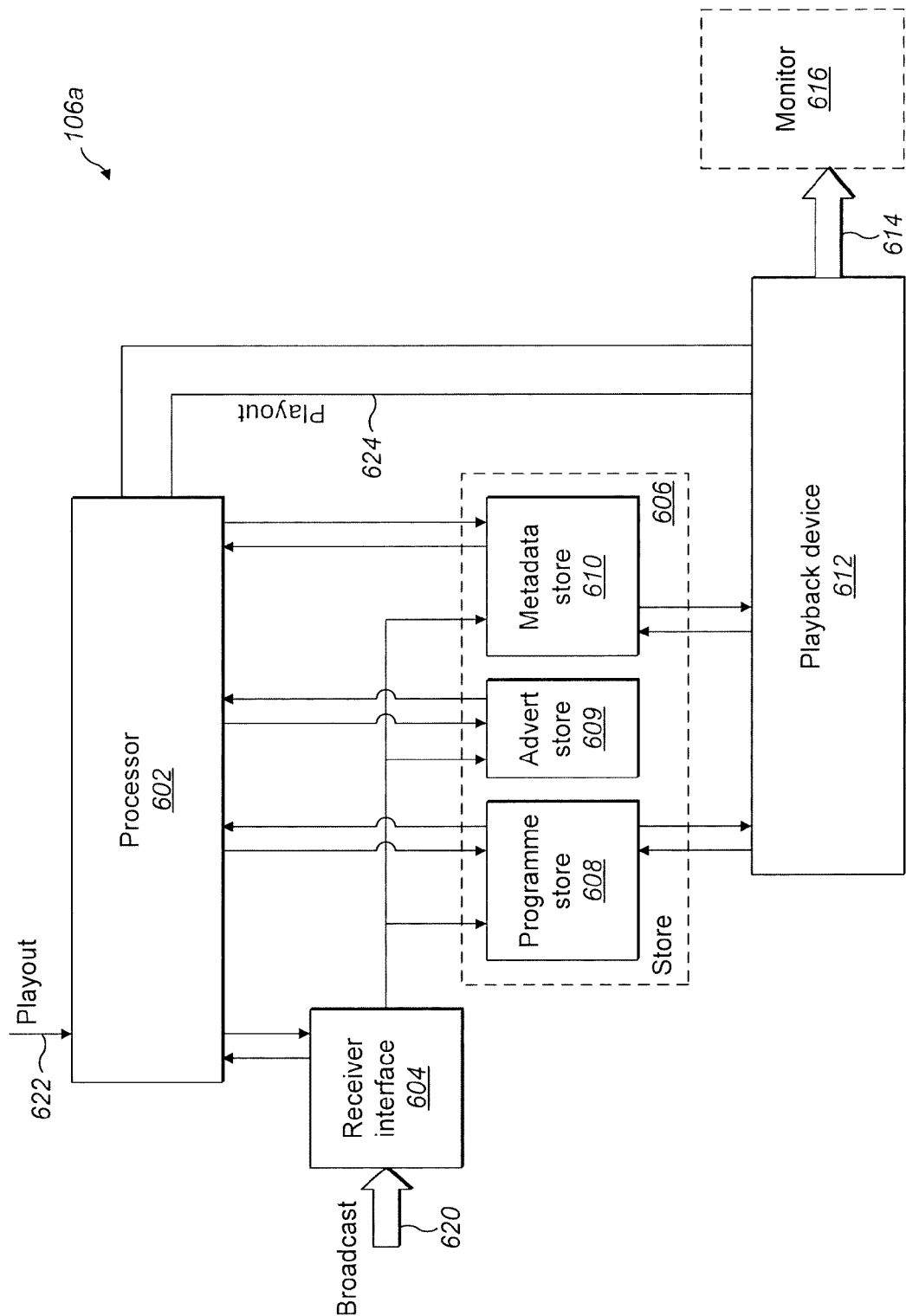
FIG. 6 show shows in further detail an example implementation of a user device of the architecture of FIG. 1.

With reference to FIG. 6, there is shown in further detail an example implementation of a user device, such as user device 106*a* of FIG. 1. In an example, the user device 106*a* includes a processor 602, a receiver interface 604, a store 606 comprising a programme store 608, an advert store 609 and a metadata store 610, and playback device 612. The processor 602 provides control signals to, and receives signals from, each other element of the user device 106*a*. The receiver interface 604 receives a broadcast programme on communication lines 620, and stores the broadcast media content associated with such broadcast programme in store 608, the advertising content (adverts) associated with the broadcast programme in store 609, and the metadata associated with such broadcast programme in metadata store 610. The broadcast programme has been prepared in accordance with the processes described above, and transmitted by the broadcast delivery server 104 as described above. As such the broadcast programme has separate media content, advertising content and metadata, and these can be stored in separate entities as shown.

The playback device 612 plays the programme to a user as denoted by lines 614—this programme is played using a monitor 616, the programme preferably including video content. The processor 602 receives a playout control signal on line 622, and generates an internal play out control signal on line 624 to the playback device 612. Shown in FIG. 6 is a monitor 616 connected to the playback device 612. In some implementation the monitor 616 may be part of the playback device. In some implementations the monitor 616 is separate to the playback device.

As described, the broadcast delivery server 104 delivers the entire programme, including the media content and the advertising content. In alternatives the broadcast delivery server may provide just the media content part of the programme, and the user device may retrieve the associated adverts from the advertising content server based on the metadata identifying the advertising content. The metadata is also provided to the user device.

In embodiments there is a manifest that defines first of all the advert candidates, and which includes the location of an advert server from which the adverts can be downloaded. This manifest may be used at the server side to pull the adverts from the advert server, interleave them into the media content as described, and send the whole package to the playback device together with all the other information as a programme, as described above. Alternatively, the manifest may be sent to the playback device together with the media content, the rules etc. The playback device is then in charge to prepare the programme with interleaved advert candidates, before playback starts by retrieving the advertising content from the advert server based on the manifest.

For the packaging there is thus more than one option. Keeping the media content and advertising content files detached may be preferable. Playing of a recorded media content may start, followed by an advert span for 10 seconds, and then the recorded media content playback resumes. The client playback device switches to advertising content and pauses the playback of the recorded media content file, during an advertising break.

Regardless of how they are received, the media content and the advertising content comprising candidate adverts are preferably stored in the playback device.

Figure 7:
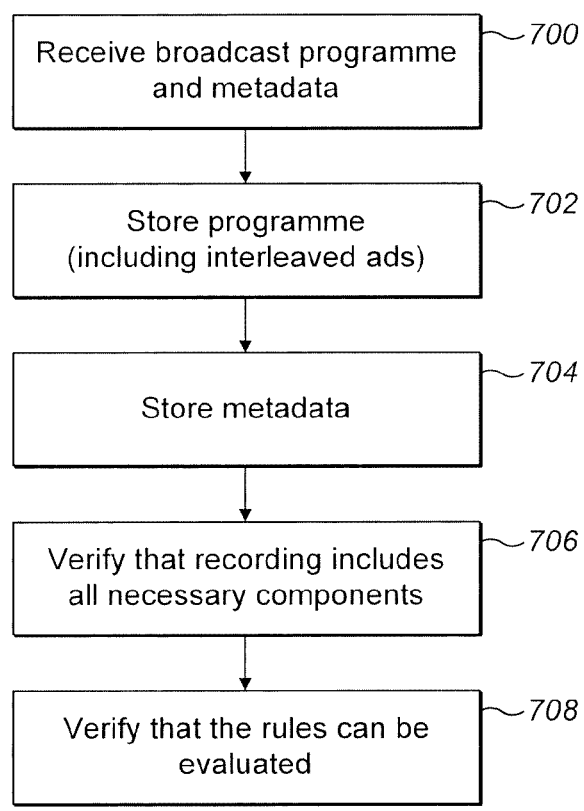
FIG. 7 illustrates an example process performed by the user device of FIG. 6 on receiving a broadcast.

FIG. 7 illustrates an example process performed by the processor 602 of the user device 106*a*. In a step 700, the broadcast programme and metadata are received by the receiver interface 604. In a step 702 the programme, including the interleaved media content and advertising content, is stored in the programme store 608. In step 704, the metadata included in the broadcast and associated with the programme is stored in the metadata store 610.

In step 706, the processor 602 verifies that the recording, i.e. the stored programme, includes all the necessary components. This is independent of any technique for delivering the components. Necessary components include: the recording from the broadcast, the additional advertising media, and the metadata, including the rules to be evaluated.

In step 708 the processor 602 verifies that the rules contained in the metadata can be evaluated. For example, a rule may be: (i) "advert 1 in ad break 2 should not be shown if the date of playback is later than 1 Sep. 2017, if so insert alternative ad 4"; (ii) "advert 2 in ad break 3 should not be shown if playback on a mobile device, if so select any ad from the alternative ad playlist instead". Step 708 determines that all rules can be applied.

The programme stored at the user device may be available to be played back at the user device in a certain time window, or it may be available to be played back in an open-ended time.

The user device may be associated with a user, and may store a user profile of that user.

The time at which the programme is played back at the user device may be used to select between the candidate adverts. If the programme is played back multiple times, the advert selected may be different.

The user profile of the user of the user device may be used to select between the candidate adverts.

Figure 8:
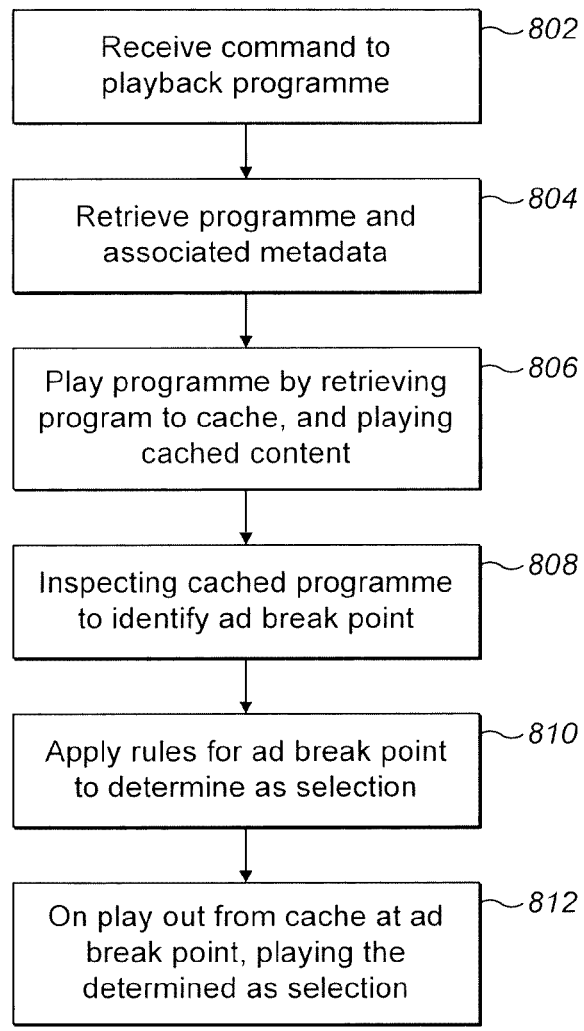
FIG. 8 illustrates an example process performed by the user device of FIG. 6 on playback of content.

FIG. 8 illustrates an example process performed by playback device 612 on playback operation.

In a step 802 the processor 602 receives a command to playback a programme, on signal line 622. This command is forwarded to the playback device 612 on line 624. In a step 804, the playback device 612 retrieves the programme and the associated metadata from the respective stores 608 and 610. In a step 806, the programme is delivered to a cache, and then the playback involves playback of the cached content. In a step 808 the cached content is inspected to identify advertising breaks in the programme. In a step 810, on identification of an advertising break the playback rules defined in the metadata are applied to determine advertising content selection. In a step 812 on play out from the cache, at the advertising break point, the determined selection of advertising content is played out.

The playback device must be able to detect when an advert is encountered during playback of the recording, evaluate the rules and then select the candidate advert (e.g. omit, skip or replace the advert) as necessary.

The recording may be stored, and subsequently delivered in a broadcast, as a single pair of files: one media file and one metadata file. The media file comprises the recording of the programme, including the media content and the advertising content. For the advertising content, alternative adverts are interleaved within the programme as discussed above.

The metadata file includes traditional recording metadata, such as the time of recording, the duration of recording, the source channel of the recording etc. In addition, information about where in the recording advertisement breaks can be found, where the alternative adverts are added etc. is included. The playback rules that are to be evaluated by the user device to determine which advert to select in a slot (e.g. when to wipe or play embedded adverts and when to use alternative adverts) are also included in the metadata.

A process for selecting and inserting an advert in a played-back programme is now described.

When the content is played and an advert slot is approaching, the following rules may be applied to the first advert candidate:
1. Is the current time within the allowed time period?
2. Is the playout device appropriate?
3. Is the current location of the playback device within the allowed region?
4. Is the profile information of the advert in accordance with the profile information of the consumer associated with the playback device?

These are of course only examples, but they do represent different types of information. The criteria could be represented by external information such as time, location, user information (or user profile information) such as gender or age of a consumer, as well as device information such as device type and as well as user information (the user of the playback device).

In addition it might be appropriate that together with the playback rules, and the metadata of each advert candidate, the broadcaster might also specify how many of these rules an advert candidate has to comply with before it should be shown or before the system goes over to the next candidate.

It could also be possible that the rules are categorized into a set that is mandatory to be fulfilled or optional to be fulfilled. The set of mandatory rules may define conditions that a candidate advert has to comply with, and a set of optional rules may define conditions that results in a candidate advert being ranked higher, if the advert complies with it, or it may not be required for an advert candidate to comply with one optional rule if it complies with another optional rule. For instance the time period might be a mandatory rule to comply with, whereas an individual advert candidate may have to comply with at least with 2 of 4 optional rules—some but not all.

The mandatory category could also be used as a criteria to request a new set of adverts (as discussed below) if all of the available candidates are stale and therefore do not comply with a mandatory rule such as a mandatory time rule.

The step of checking the mandatory rules can be done periodically, independent from the actual playback.

It may be also flagged actively as soon as all the advert candidates cannot comply with the mandatory rules, so that a request for a new set of adverts can be sent out to a server (as discussed below).

Figure 9:
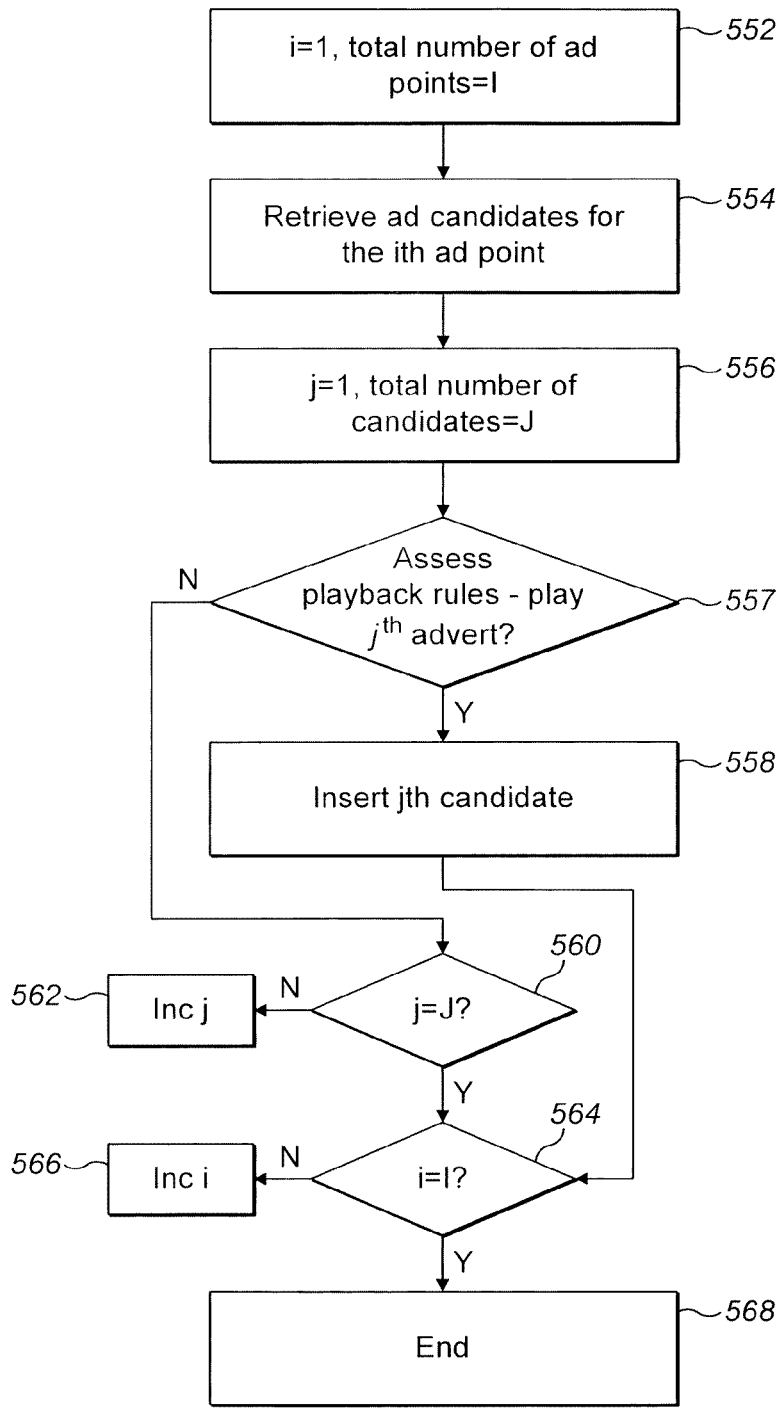
FIG. 9 illustrates an example implementation of the determination of the display of advertising on playback of a programme.

With reference to FIG. 9, there is illustrated an example process for inserting the advertising content in the programme i.e. for selection of an advert from the candidates.

In a step 552, the current advertising slot is determined as i, and the total number of advertising slots is I. Initially i=1.

In a step 554, the candidate adverts for the $i^{th}$ advertising slot are retrieved. In a step 556, the current advert candidate is set at j, and the total number of candidates for the slot is J. Initially j=1.

In a step 557, the playback rules are assessed for the $j^{th}$ advertising candidate. If the assessment of the rules indicate that the $j^{th}$ advertising candidate should be shown, then in step 558 the $j^{th}$ adverting candidate is chosen, then the $j^{th}$ candidate is inserted. Thereafter the process moves on to step 564.

If the assessment of the rules indicate that the $j^{th}$ advertising candidate should not be chosen, then the process moves to step 560. In step 560 it is determined whether j is equal to J. If it is not, then in a step 512 j is incremented, and then steps 557 and 558 repeated. If it is, then the process moves onto step 514.

In step 564 it is determined whether i is equal to I. If it is not, then in a step 566 i is incremented, and step 554 onwards repeated. If it is, then in a step 568 the interleaving of advertising candidates for a particular advertising window is concluded.

A candidate advert may be selected in dependence on some or all of:
date;
time;
type of playback device (e.g. mobile, tablet, laptop, PC, television);
location of device at time of playback;
network connection at time of playback (e.g. identity of WiFi network);
user account profile (e.g. user gender, user age, etc.);
user acquired profile (e.g. user preferences for types of content, type of activity etc.).

Other information may be additionally or alternatively used.

Where weighting is used, a score may be attributed to a candidate advert based on an assessment of a comparison of its metadata to some or all of the above.

It will be understood that this process is performed for each advertising window. In alternative examples the number of candidates for each slot may not be the same. The number of candidates for any slot may be more or less than three.

Alternative schemes for selecting between candidate adverts may be used. In the scheme of FIG. 9, the candidates are presented in an order, and if the current candidate being assessed meets the rules criteria it is used. This implies that the candidates are presented in an order, such that earlier candidates have preference over later candidates if they meet the rules criteria.

Alternatively all candidates may each be assessed against the rules criteria, and a weighting applied to the assessment of each candidate, and then the candidate having the highest weighting chosen. Where there are provided mandatory and optional rules, the optional rules are applied to give a weighting to each candidate complying with the criteria of the mandatory rules. The weighting may, for example, be based on the number of optional rules which are complied with.

Figure 10:
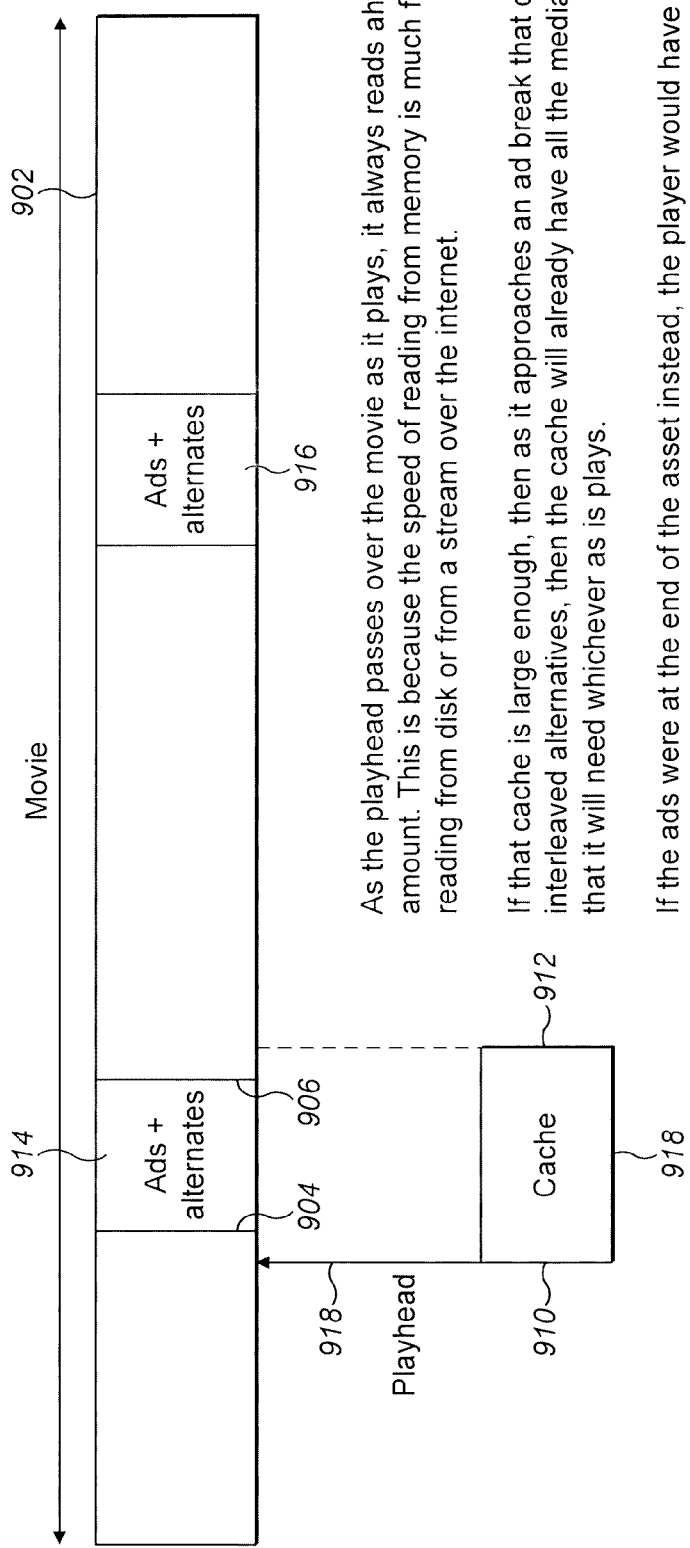
FIG. 10 illustrates an example playback of a programme and advert.

With reference to FIG. 10 this technique is illustrated further. FIG. 10 shows a movie being played out. The movie is denoted by reference numeral 902, and includes advertising break portions 914 and 916. The advertising break portion 914 starts at a point denoted by reference numeral 904 and ends at a point determined by reference numeral 906. As discussed above, in an embodiment the programme is transferred to a cache, and then played out from this cache. The earliest content in the cache is the content being played out currently. As noted in FIG. 9, a portion of content denoted by reference numeral 918 is cached, having a starting point denoted by reference numeral 910 and an end point denoted by reference numeral 912. If the length of the cache is sufficient, the portion at the front of the cache at location 910 can be a portion of the movie prior to the advertising break at location 914, and the portion of the cache at location 912 can correspond to the location 916 or later. Thus the processor 602 can evaluate the advertising segment within the cache whilst the video content is still being played out from within the cache, but before the advertising break point is reached. Thus as the play-head passes over the movie as it plays, it always reads ahead a set amount. This is because the speed of reading from the cache memory is much faster than reading from disk in the user device 106a (or from reading a stream over the internet). If the cache is large enough then as it approaches an advertising break that contains interleaved alternatives, then the cache will already have all the media loaded that it will need whichever advertising content is played. By contrast, if the advertising content was at the end of the asset instead (i.e. provided as a separate file located at the end of the content file), the playback device would have to read the media in two places at once, which would be messy, inefficient and slow.

Figure 11:
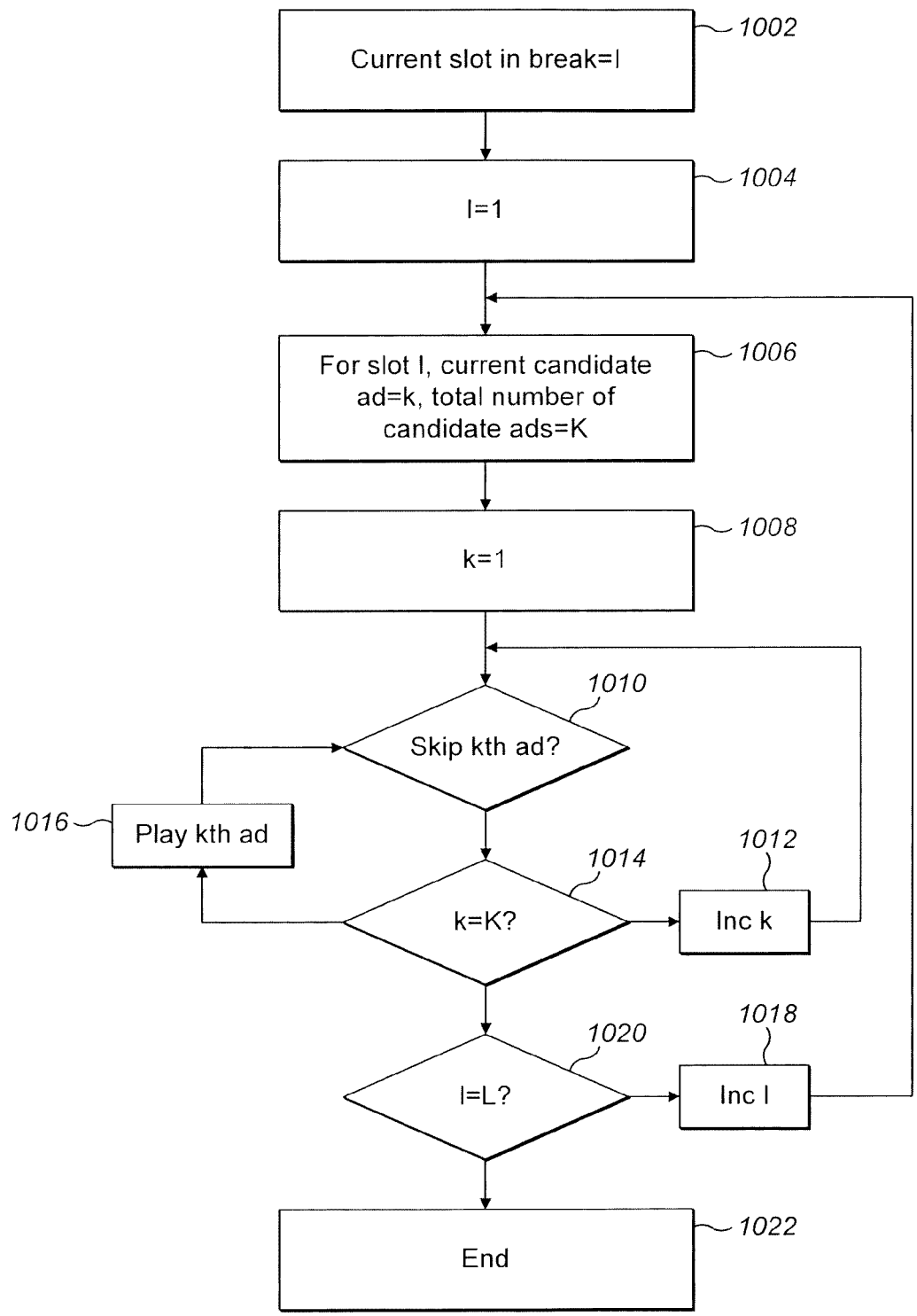
FIG. 11 illustrates an example process for determining the advertising content in an advertising period or window of the programme.

With reference to FIG. 11, there is illustrated an example process for determining the advertising content in an advertising period or window of the programme.

In step 1002 the current advertising slot of the advertising break is determined to be l, where the total number of advertising slots is L. In step 1004 the initial value of l is set to 1.

In step 1006, for slot l it is determined that a current advertising candidate is k, the total number of candidates for the slot being K. In step 1008 $k$ is set to 1. In a step 1010 a determination is made as to whether the rules require, for slot l, whether the $k^{th}$ advertising content should be skipped. If it is not to be skipped, then the $k^{th}$ advertising content is played in step 1016, and then the process moves to step 1020. If it is to be skipped, in step 1014 it is determined if k is equal to K. If it is not, then the value of k is incremented by one in step 1012, and then the process returns to repeat step 1010.

If it is, then the process moves to step 1020, and it is determined whether all advertising slots have been processing by comparing l to L. If l is equal to 1, then all advertising slots have been processed, and the process ends in step 1022. If it is not, then l is incremented by one in step 1018, and then step 1006 repeated.

In general, when the played out programme reaches a mark for playing out an advert, the playback rules supplied in the metadata are applied to determine which advert, of the candidate adverts for an advert slot, is to be selected and played out.

In order to apply the playback rules, the current time may be compared to time windows associated with candidate adverts, or the user profile may be accessed to determine if a user profile characteristic matches a profile of a candidate advert.

A fixed set of selection rules based on ordering a priority is the preferred approach. For example, the metadata of a programme contains information that there are few alternative adverts for each advert slot, with each one having its own sub-metadata (e.g. date of expiry, date of activation, etc.). A rules engine will select one or the few adverts.

The candidate adverts may be selected in sequence: if the first advert meets the criteria it is chosen. Thus the sequence may have some priority associated with it. Alternatively all candidate adverts may be assessed, and the highest ranking chosen.

The user device may be configured to enable a report on which adverts were actually shown to the viewer to be compiled.

The (playback) user device may be able to refresh one or more of the set of alternative adverts which are stored in the playback device if it is determined that one or more of those adverts require replacing, for example because one or more adverts have become out of date. The broadcast delivery service controller 103 knows the candidate adverts that were initially included in the broadcast programme, and thus can identify if any of these need to be replaced, for example because they have become stale due to elapsed time. If so, the controller 103 may control the transmission of a replacement candidate advert for a programme to the playback device. The controller can then update its details of the candidate adverts accordingly, and continue to monitor the candidates for any staleness.

The broadcaster, at the server side, thus may have knowledge on the freshness/staleness of adverts, and therefore can provide a new package of alternative adverts, corresponding to its own settings. The controller 103 may periodically send a new package to the playback device. Alternatively the playback device may send out periodically a request as to whether or not the controller 103 wants to update the advertising content, and if there is a new advert or a new advertising package it is sent. An update is thus accomplished.

The playback device might have also the intelligence that according to the rules in combination with the metadata of the several advert candidates, it knows that the current package (or one of the candidates) does not have advert candidates that comply to the rules, e.g. due to staleness. As a result it may send out a request to the controller 103 to send new alternatives for the candidate adverts.

The described technique provides a memory at the playback device, in which the alternative adverts are stored. During playback, the rules are applied and the result provides the appropriate advert candidate that should be shown. This solution is particularly suited for offline embodiments.

The described technique does not fetch the adverts during the playback of the recording. Rather on playback the stored candidate adverts are assessed, chosen and played. The candidate adverts may be updated periodically, such as on start-up or following a wake-up signal of the device, or during low network load hours etc.

The provision of new (or replacement) candidate adverts, or the request for such, is during online connection or the playback device. The playback of a recorded programme, and the application of playback rules, is preferably during an offline scenario of the playback device.

It has been described that the media content, the advert content and the rules are all transmitted together from the server to the user device. However the media content, the advert content, and the rules could all be transmitted separately to the user device.

The store—or cache—of advert content can be refreshed based on a request from the user device to a third party advertising server (or party), or based on an update from a third party advertising server (or party). The controller is an example only.

In an alternative arrangement, the playback device may be in communication, via an interface, with a cloud-based device when online. The cloud-based device may store the candidate adverts, which are copied to the store of the playback device. The candidate adverts stored in the playback device may be updated, and responsive to that update the updated candidate adverts are automatically copied to the playback device.

A similar automatic transfer may be provided for information as to which adverts are played. This information is stored in the playback device, and automatically copied to the cloud-based device.

The automatic transfer between the playback device and the cloud-based device may occur whenever the cloud-based device is connected on-line.

The alternative adverts and rules may only be needed if the programme is recorded for later playback. However as the alternative adverts and rules may utilise user profiles, the alternative adverts and rules may be used for live content also.

The technique as described may be implemented on a playback device without any connection between the playback device and a central control or server. The programme including advertising content is stored on the playback device, together with the associated metadata including all rules for selecting advertising content. The rules can be applied, and the content selected and played, without any connection to a central controller or server. The technique as described can be implemented on a stand-alone playback device.

The invention has been described by way of reference to examples and embodiments. The invention is not limited to the specifics of any example given. Different features of different aspects may be combined. No feature is limited as being only utilised in combination with the other features with which it is described.

The invention claimed is:

1. A method of playing media content including an advertising period at a playback device, the method comprising:
    storing the media content in the playback device for playback to a user of the playback device;
    storing an indication of the playback time of the advertising period relative to the playback time of the media content;
    storing a plurality of candidate adverts for playing in the adverting period of the media content;
    playing the stored media content to the user of the playback device;
    identifying, on playing of the stored media content, a point in time corresponding to the playback time of the advertising period;
    applying, responsive thereto, playback rules to determine an advert to be played from the candidate adverts, comprising:
        applying mandatory rules to the candidate adverts to identify a set of candidate adverts complying with the mandatory rules;
        applying optional rules to each candidate advert complying with the mandatory rules, wherein applying the optional rules comprises:
            weighting each candidate advert complying with the mandatory rules in dependence on its compliance with the optional rules; and
            selecting the candidate advert having the highest determined weighting; and
    playing the candidate advert having the highest determined weighting at the playback time of the advertising period.

2. The method of claim 1, further comprising, prior to the step of playing the stored media content, receiving a notification of updated candidate adverts for playing in the advertising period, and replacing the stored plurality of candidate adverts with the updated candidate adverts.

3. The method of claim 1 wherein the playback device is not connected to a network on playback of the media content.

4. The method of claim 1 wherein weighting a candidate advert comprises one or more of: ranking a candidate advert in dependence on the number of optional rules with which it complies; determining if a candidate adverts complying with one optional rule also complies with another optional rule; and determining if a candidate advert complies with two or more optional rules.

5. The method of claim 1 wherein the playback rules are compared with the metadata of candidate adverts.

6. The method of claim 1 wherein the media content is associated with a plurality of advertising periods, there being provided a plurality of candidate adverts for each advertising period.

7. The method of claim 1 wherein the playback rules are applied in dependence on one or more of: a user profile stored at the playback device; a time of the playback.

8. The method of claim 1 further comprising an interface for communicating with a cloud-based device for storing candidate adverts, wherein when a candidate advert is updated at the cloud-based device, the cloud-based device communicates a corresponding update to make at the playback device corresponding to the update at the cloud-based device.

9. A playback device for playing media content including an advertising period comprising:
    a store for storing the media content in the playback device for playback to a user of the playback device;
    a store for storing a plurality of candidate adverts for playing in the adverting period of the media content;

wherein the playback device includes a processor configured to:
- play the stored media content to the user of the playback device;
- detect, on playing of the stored media content, a point in time corresponding to a playback time of the advertising period;
- apply, responsive to the detection, playback rules to determine an advert from the candidate adverts, comprising:
  - apply mandatory rules to the candidate adverts to identify a set of candidate adverts complying with the mandatory rules;
  - apply optional rules to each candidate advert complying with the mandatory rules, wherein the optional rules comprise:
    - weighting each candidate advert complying with the mandatory rules in dependence on its compliance with the optional rules; and
    - selecting the candidate advert having the highest determined weighting is selected for playback; and
- play the candidate advert having the highest determined weighting at the playback time of the advertising period.

10. The playback device of claim 9 wherein weighting a candidate advert comprises one or more of: ranking a candidate advert in dependence on the number of optional rules with which it complies; determining if a candidate advert complying with one optional rule also complies with another optional rule; and determining if a candidate advert complies with two or more optional rules.

11. The playback device of claim 9 wherein the processor is configured to apply the playback rules to each candidate advert for an advertising period in a predetermined sequence, wherein if a candidate advert satisfies the playback rule it is selected and none of the remaining candidate adverts are accessed for that time period.

12. The playback device of claim 11 wherein the predetermined sequence corresponds to the weighting associated with each advertising candidate.

13. The playback device of claim 9 wherein the processor is configured to apply the playback rules in dependence on one or more of: a user profile stored at the playback device; a time of the playback.

14. The playback device of claim 9 further comprising an interface for communicating with a cloud-based device for storing candidate adverts, wherein when a candidate advert is updated at the cloud-based device, the cloud-based device communicates a corresponding update to make at the playback device corresponding to the update at the cloud-based device.

* * * * *